United States Patent
Rice

(10) Patent No.: US 9,483,170 B2
(45) Date of Patent: Nov. 1, 2016

(54) METHOD AND APPARATUS OF ERROR CORRECTION IN RESISTIVE TOUCH PANELS

(75) Inventor: Jason Truman Rice, Plano, TX (US)

(73) Assignee: AMX LLC, Richardson, TX (US)

(*) Notice: Subject to any disclaimer, the term of this patent is extended or adjusted under 35 U.S.C. 154(b) by 340 days.

(21) Appl. No.: 12/951,199

(22) Filed: Nov. 22, 2010

(65) Prior Publication Data

US 2012/0131515 A1    May 24, 2012

(51) Int. Cl.
*G09G 5/00* (2006.01)
*G06F 3/041* (2006.01)
*G06F 3/0488* (2013.01)
*G06F 3/045* (2006.01)

(52) U.S. Cl.
CPC .......... *G06F 3/0488* (2013.01); *G06F 3/0418* (2013.01); *G06F 3/045* (2013.01)

(58) Field of Classification Search
CPC ......... G09G 5/00; G06F 3/041; G06F 3/044; G06F 3/0418; G06F 3/0488; G06F 3/045
USPC ................... 345/173, 178; 715/863
See application file for complete search history.

(56) References Cited

U.S. PATENT DOCUMENTS

| | | | | |
|---|---|---|---|---|
| 5,694,536 A * | 12/1997 | Gangnet | ................. | G06T 11/40 345/442 |
| 2003/0231219 A1* | 12/2003 | Leung | ................. | G06F 3/04883 715/863 |
| 2006/0279556 A1* | 12/2006 | Tsang | .................... | G06F 3/0418 345/173 |
| 2008/0150909 A1* | 6/2008 | North | .................... | G06F 3/0418 345/173 |

\* cited by examiner

*Primary Examiner* — Temesghen Ghebretinsae
*Assistant Examiner* — Paras D Karki

(57) ABSTRACT

A method and apparatus of generating display data based on at least one input display value received from a touch screen device is disclosed. According to one example method of operation the method may include receiving an input display value in a predefined enclosed area of an input domain, and calculating a parametric representation of the received input display value based on the boundaries of the predefined enclosed area in the input domain. The predefined enclosed area may be a triangle. The operations may also include mapping the parametric representation of the input display value to a corresponding output display value in an output domain. The operations may also include displaying the at least one output display value via the display device.

11 Claims, 8 Drawing Sheets

METHOD AND APPARATUS OF ERROR CORRECTION IN RESISTIVE TOUCH PANELS

TECHNICAL FIELD OF THE INVENTION

This invention relates to a method and apparatus of correcting errors in resistive touch panel devices, and, more specifically, to implementing an algorithm that includes a triangular mesh of error vectors to obtain optimized touch screen performance.

BACKGROUND OF THE INVENTION

Resistive touch panels are inherently nonlinear in response. For example, a user touching a touch screen with their hand or a stylus touch-pad pen may contact the touch screen in a specific two-dimensional point. As a result, the touching may produce an output result that does not match the exact location touched. Fabrication methods inevitably provide slight inconsistencies in the resistivity across a given axis of a touch panel.

Despite the intent of a single plane of a two-plane panel to be linear in one-dimension per plate, inconsistencies may occur in the direction of the axis orthogonal to the intended location touched, which, in turn, may cause coupling of the error in the direction of one axis to the error in the direction of the other axis. Such coupling and other undesired effects may produce an output that is not representative of the intent of the user of the touch pad.

SUMMARY OF THE INVENTION

One embodiment of the present invention may include a method of generating display data based on at least one input display value received from a touch screen device. The method may include receiving the at least one input display value in a predefined enclosed area of an input domain, and calculating a parametric representation of the at least one received input display value based on the boundaries of the predefined enclosed area in the input domain. The method may also include mapping the parametric representation of the at least one input display value to a corresponding at least one output display value in an output domain, and displaying the at least one output display value via the display device.

Another example embodiment of the present invention may include an apparatus configured to generate display data based on at least one input display value received from a touch screen device. The apparatus may include a receiver configured to receive the at least one input display value in a predefined enclosed area of an input domain. The apparatus may also include a processor configured to calculate a parametric representation of the at least one received input display value based on the boundaries of the predefined enclosed area in the input domain, and map the parametric representation of the at least one input display value to a corresponding at least one output display value in an output domain, and a display configured to display the at least one output display value.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
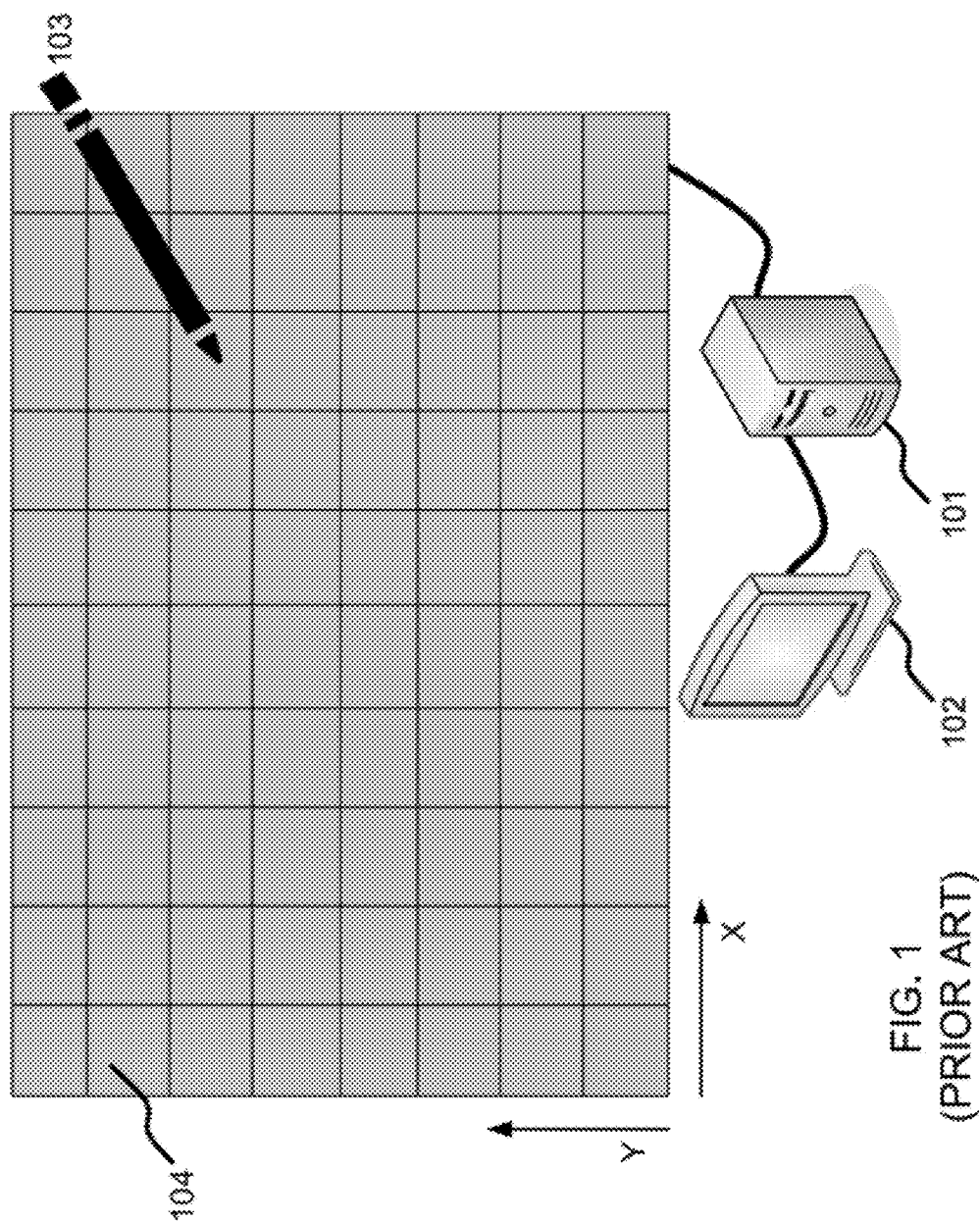
FIG. 1 illustrates an example touch screen device, according to conventional touch screen devices.

FIG. 1 illustrates a conventional two-dimensional (2-D) touch screen with x and y coordinates. In this configuration, user input is received on the surface of the touch screen 104 (which has been expanded for explanatory purposes). The touch screen 104 may receive input from user touch or from a stylus pen 103. Data is received in the two-dimensional plane via the sensors embedded in the two-dimensional grid (not shown). Generally, the user input is received on the surface of the touch screen 104 and is processed via a processing computer device 101 and displayed on a display or output device 102.

One example embodiment of the present invention may include an algorithm that defines a pair of isomorphic meshes of connected triangles. For instance, meshes of triangles that are similar enough to map between for purposes of translation from the domain of one mesh to the domain of the other mesh. The isomorphic meshes may be defined in any configuration and resolution appropriate for computation or data representation.

The input domain may include voltage measurements in the area of 0V to 10V, and, the desired output values could be represented as pixel locations in a frame buffer and/or on a display screen ranging, for example, from 0 to 1024 pixels in one axis direction and 0 to 768 pixels in another axis direction. The input and output domains each include data points in the form of isomorphic meshes. Each of the isomorphic meshes may be defined by the unit and dimension of its respective domain. According to one example, the input and/or output domain measurements may be arbitrarily digitized, quantized and/or converted to other units.

According to one example, an optimal representation may be represented as two collections of piecewise linear and bounded spaces. For example, a connected network of triangles may be created and used to serve as input and error correcting domains. A first mesh may be defined in the input domain of the touch panel as either electrical measurements and/or as digital representations of the input values in both or all axes of the touch screen. The second mesh may be defined as the desired target output values in the display coordinate system and/or an otherwise applicable representation range of the output device (display).

Figure 2:
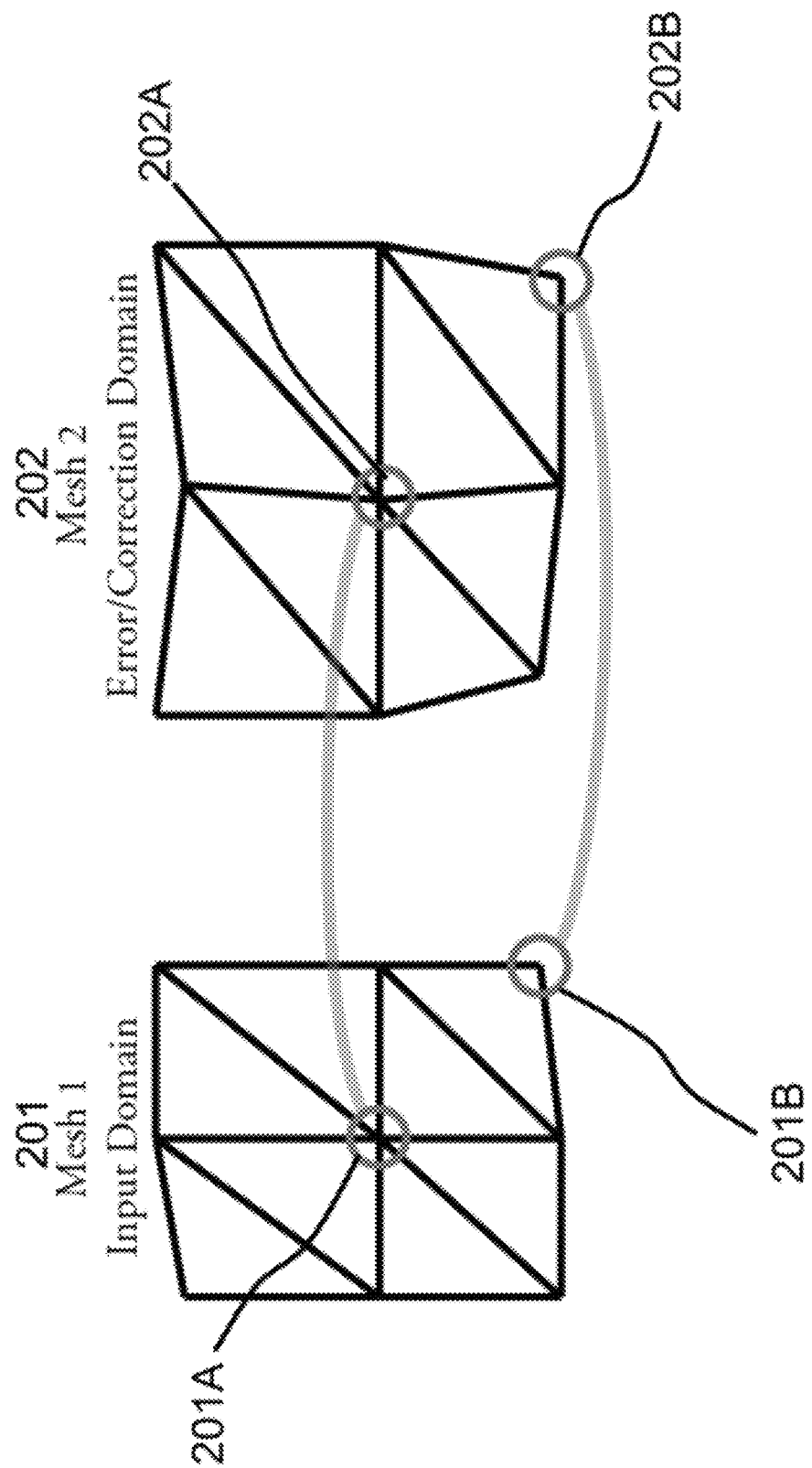
FIG. 2 illustrates an example input and output triangle mesh configuration, according to example embodiments of the present invention.

FIG. 2 illustrates an example mesh representation, according to example embodiments of the present invention. Referring to FIG. 2, meshes of triangles may be described as a network of points, a series of edges, regions, etc., that are bounded parametrically. Parametric representations include a finite-dimensional parameter space or spaces. A parametric representation of points may be based on a combination of input values within a particular mesh space. For example, an input domain (see mesh 1, 201) may include combinations of input mesh values 201A and 201B.

Such input mesh values 201A and 201B may be represented by barycentric calculated positions on one or more triangles used to define the input mesh area 201. The input mesh values 201A and 201B may be transposed or mapped to a similar mesh topology. This mapping procedure may be performed between similar mesh topologies in the input domain 201 and the output domain 202. FIG. 2 illustrates the output domain mesh 2 (error/correction domain) and the mapping of points from mesh 1 to mesh 2. The similar mesh topologies of the input and output domains allows a simple mapping from one parametric position on the input mesh 201 to an equivalent position on the output domain 202.

Another example of interpreting user input may include any computationally appropriate series of piecewise contained regions. As illustrated in FIG. 2, the meshes of triangles, may be configured as a contiguous array of triangles spanning the input domain and output domain ranges, respectively. The meshes and their parametric spaces may be implemented as software and/or in hardware/firmware for the error correction of touch panel devices, or other input devices either as a component of their design and construction and/or added as an after market feature by installation.

According to example embodiments of the present invention, a computational algorithm may be used to perform calculations to increase accuracy and reduce unwanted touch panel input and output errors. The algorithm may be implemented by assigning sampled or derived input values from the touch panel in both the x-axis, the y-axis and/or in the direct ion of additional axes. The input values may be assigned to each point in the input mesh.

According to one example embodiment, an input point provided by a user may be a point touched by hand or a pen stylus 103. For example purposes, it will be assumed that the input point is one point, although, the touched point may include multiple measured points. The input point may be translated to a desired output value by locating its position on the input mesh with respect to the x-axis, y-axis and/or other axes. The point may be converted to a parametric form, such as, a weighted average of vertices of the enclosing triangle from the mesh in the input domain. For example, a point exactly centered in the triangle would be represented as the combination of combined weights of the vertices. In a vector form, this may be represented as [⅓, ⅓, ⅓].

A translation may then be performed from the input mesh value to a parallel output mesh value, and its desired value for the display or output may be assigned to the equivalent point in the output mesh, as illustrated in FIG. 2. In the example of the input value being centered at the center point of the triangle, the equivalent weighted average of the vertices of the isomorphic equivalent output triangle wound then place the error corrected output value at a location centered on the same triangle.

The input mesh 201 represents the input provided by the user replete with any error(s) based on specific sample points measured in the input mesh. The output mesh 202 represents the desired corrected output for correlated points between the input mesh 201 and the output mesh 202. The two meshes together provide fewer errors and increased accuracy between what was intended and what result is outputted on the display. The optimized output may be realized by directly mapping the two meshes via the topology of the input and the output meshes and simplifying the result via a parametric representation with each mesh's domain.

In operation, one example may include obtaining samples from a user's interaction with a touch screen device in the input domain to obtain the value of the input. A next operation may include calculating a parametric representation of the samples based on the points included in one or more triangles. One simple representation would include determining a barycentric or linear combination of vertices of the enclosing triangle sample linked to the input mesh. While not limited to a linear combination, such a combination may be used as the simplest parametric representation to visualize. A point nearest one vertex of the triangle will result in that vertex contributing the most to the linear combination. Additional operations may include mapping the parametric representation to an output domain with corresponding triangle spaces. The isomorphic nature of the two meshes may dictate that the triangle enclosing the input value has an equivalent triangle in the output mesh. That equivalent output triangle in the output domain will, in turn, enclose the output error corrected value. Using the average of the input vertices that represent the input value(s) in FIG. 4, the resulting output may be reconstructed using the equivalent vertices of the output mesh to arrive at the desired output.

In general, to transform arbitrary input values into corrected output values, the input value is tested for inclusion in each of the triangles of the input mesh. Upon determination of a triangle in the input mesh that encloses or contains the input value in all axes, a parametric representation of the input value with respect to the three bounding points of the triangle is calculated through any appropriate method. For example, calculating a barycentric representation of the measured input point based on a weighted average of the three bounding points of the triangle may provide an acceptable parametric representation of the input data.

In the case of implementing weighted averages, vectors based on three normalized vertices of the enclosing triangle's may be used to provide an adequate representation for transformation. Similarly, a barycentric representation would provide a representation of the input value as a combination of two vectors, which are, in turn, calculated as the differences of the first and second vertices as the first vector V1, and using the first and third vertices as the second vector V2. The two vectors may then be used to calculate two weight components (W1, W2) as a weight combination of V1 and V2. The equivalent output mesh vertices are used to calculate two output vectors (O3, O4) that can then be multiplied by the weights W1 and W2 to result in a point enclosed in the equivalent output triangle 402 (see FIG. 4).

In another example, other unique representations of the measured input point in terms of the local bounded region of the triangle may provide data necessary to provide an error-corrected output. For instance, a normalized set of distances from each corner of the triangle and/or side of the triangle may be used to uniquely identify the input point's position within the triangle. For the output mesh, a similar triangle distance definition may be used to calculate the unique equivalent position of the measured input point in the domain of the output mesh.

Figure 3:
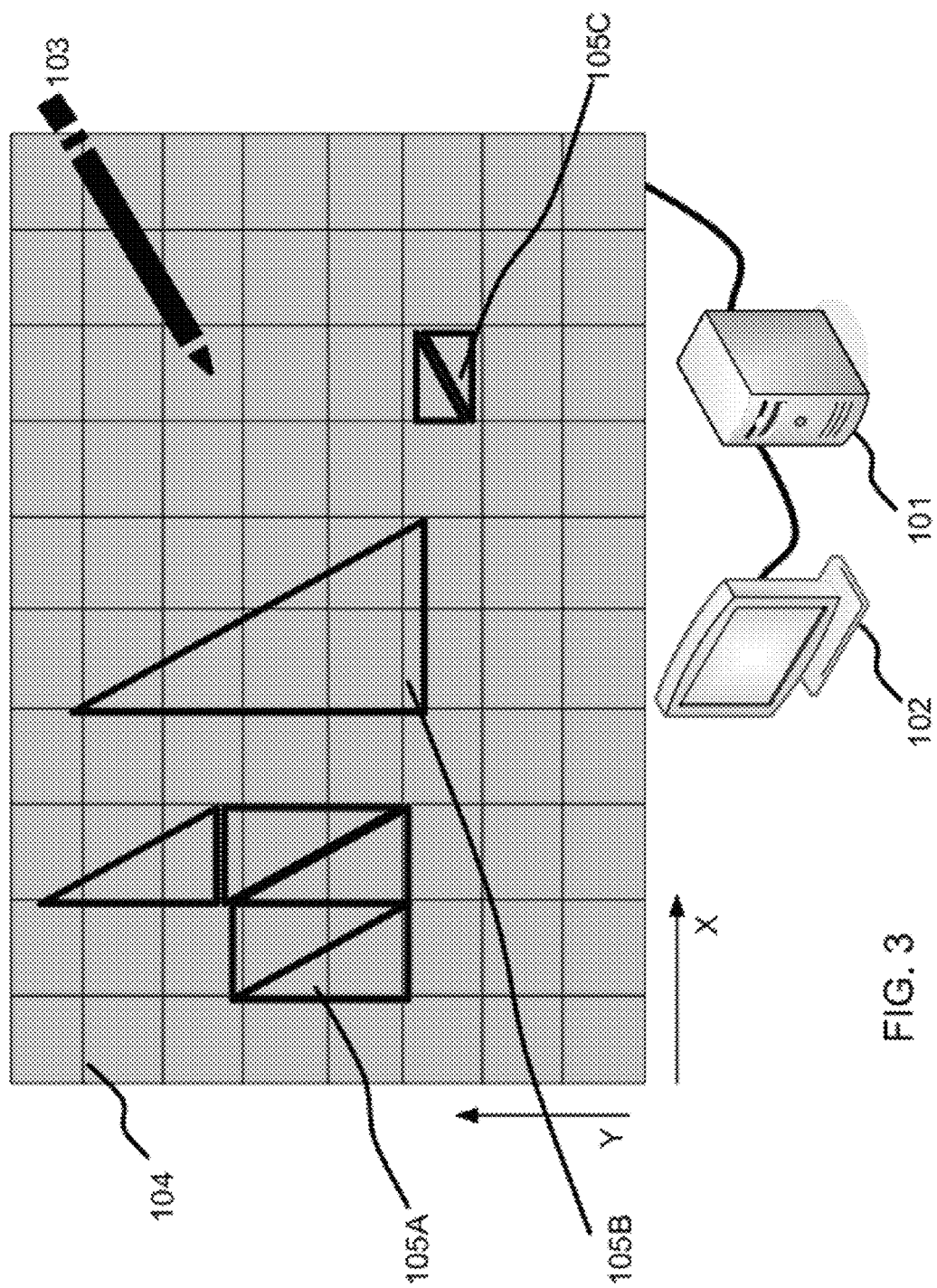
FIG. 3 illustrates an example touch screen device, according to example embodiments of the present invention.

FIG. 3 illustrates an example two-dimensional (2-D) touch screen with x and y coordinates, according to example embodiments of the present invention. Referring to FIG. 3, a series of triangles 105 are superimposed over the touch plane of the touch screen 104. These triangles may be any size as illustrated by example triangle configurations 105A, 105B and 105C. The triangles 105 may be represented in software and may not be viewable to the user of the touch screen device. Other components of FIG. 2 are similar to those illustrated in FIG. 1

The size, number and extent of the triangles in each of the input and output meshes may be sparsely or densely populated, as necessary to compensate for anticipated error fluctuations. The defined areas of the input and output meshes may extend beyond the anticipated input and output domains, or may extend to mere portions of the input and output meshes. In such cases, it may be necessary to implement extrapolation using a nearest match to the input point based on distance to a nearest edge, and/or a nearest two corners of the triangle. Other algorithms may also be used to perform a parametric representation in terms of the input point and the corresponding points in the output mesh.

A particular method of estimating the position of the input values generated may be the calculation of the input values as a barycentric linear combination of the bounding points of the triangle corners. The barycentric coordinate system is a coordinate system in which the location of a point is specified as the center of mass, or barycenter of masses placed at the vertices of a simple structure, such as, a triangle, tetrahedron, etc. Barycentric coordinates are a form of homogeneous coordinates.

Figure 4:
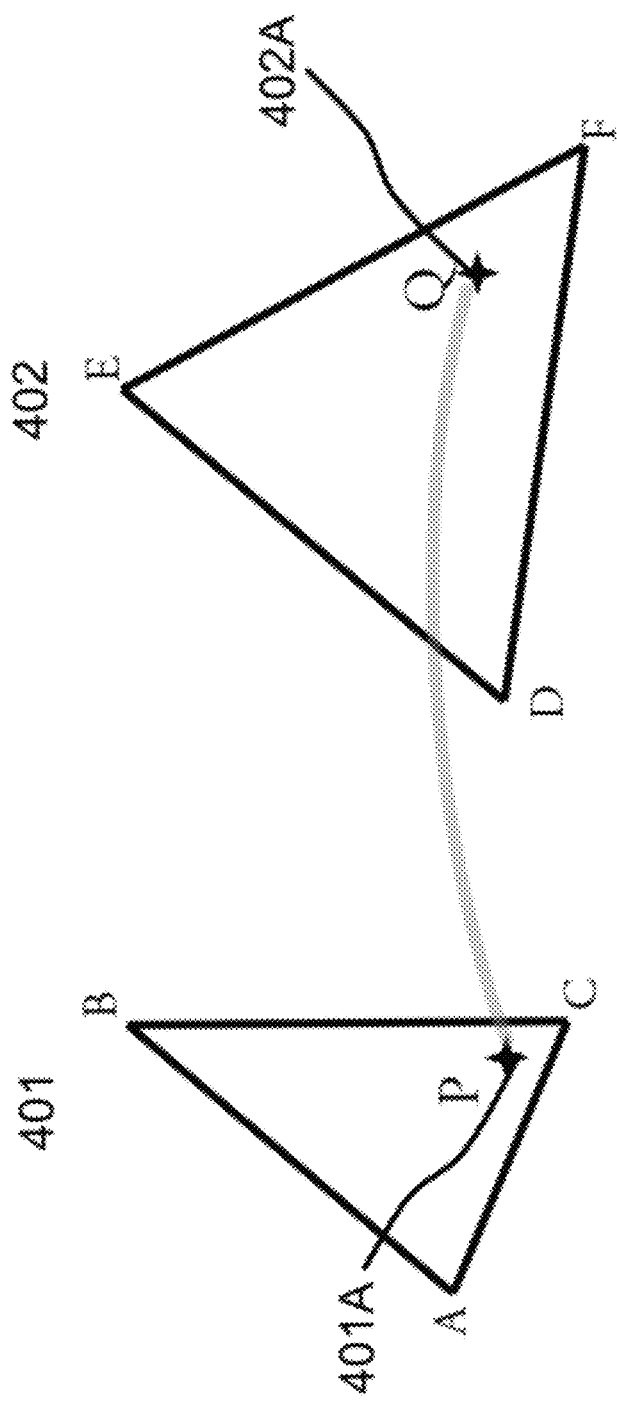
FIG. 4 illustrates an example triangle mapping configuration, according to example embodiments of the present invention.

FIG. 4 illustrates an example mapping diagram of an input point "P", according to example embodiments of the present invention. In the context of a triangle, barycentric coordinates may be also represented as area coordinates, because the coordinates of a point "P" 401A with respect to a triangle defined by three points ABC are proportional to the (signed) areas of PBC, PCA and PAB. First, consider a triangle "ABC" 401 defined by three vertices. Any point located within this triangle may then be written as a weighted sum of the three vertices of the triangle.

Clearly, point "C" is the closest to "P" and then point "A" is the next closest to "P" followed by point "B", which is furthest away from "P." The barycentric representation of "P" 401A within the triangle ABC 401, assumed to be part of the input mesh, is a linear combination of A, B and C. The linear weights may be added together to form the expression B+2A+4C to illustrate that the distance to "B" from "P" is four times the distance from "C" to "P" and two times the distance from "A" to "C." Applying the same linear weights to the vertices in triangle DEF 402 of the output mesh, an equivalent point "Q" 402A is produced in the domain of the output mesh triangle DEF 402.

A barycentric expansion may produce a vector having Cartesian coordinates in terms of the components of the triangle vertices. Barycentric coordinates are a linear transformation of Cartesian coordinates, and thus vary linearly along the edges and over the area of the triangle. If a point lies in the interior of the triangle, all of the Barycentric coordinates lie in the open interval (0,1) (based on an (x,y) coordinate system). If a point lies on an edge of the triangle, at least one of the area coordinates will be zero, while the rest lie in the closed interval (0,1).

Barycentric coordinates provide a convenient way to interpolate a function on an unstructured grid or mesh, as long as the function's value is known at all vertices of the mesh. To interpolate a function "f(x)" at a point, each triangular element must be taken into account and transformed into the barycentric coordinates of that triangle. If the point lies in the triangle or on its edge, interpolation may be used to estimate the point's position in the two-dimensional space enclosed in the triangle or nearby the triangle.

Nonlinear and/or higher order parametric representations may also be used to estimate input values received from the input display of a touch screen device. For simplicity, a simple linear decomposition may be adequate to estimate input values received. The resulting parametric representation and/or decomposition of the input value may be utilized to calculate the resulting output by applying the parametric representation to the isomorphic equivalent triangle in the output mesh.

In the specific case of a barycentric representation, the three points of the output triangle are used in the same formula to derive the barycentric space and then linear weights are applied to the result in an output value enclosed by the equivalent triangle in the output mesh. More complex representations may assume the reconstruction of the data input position within the target output triangle.

In the case that the input point is not enclosed in any of the triangles of the input mesh, any triangle determined as being closest or most appropriately matched to the input values should then be used as a reference for the above-noted position determination algorithms. Assuming the parametric representation of the input values are viable and translate to the output range within the description of the output mesh and the numeric representation of the output display, other algorithms may be implemented to obtain accurate position information of the input and corresponding output values.

According to one particular example, with no constraints on either the input or output mesh geometry (e.g., no grid alignment or fixed sample distance for either the input or output points, edges or regions), the most time-intensive portion of the algorithm will likely be the determination of inclusion in a triangle. To accelerate the computation of the error corrected output value, a full lookup table for each possible input value can be pre-computed and stored in memory for reference purposes. Resulting output values may then be either the exact value as referenced by the input value, or interpolated in as many dimensions as is appropriate for the storage. A specific example may include a fixed resolution grid in both or all axes less than the maximum resolution of the input device. Such a grid should be suitable to capture expected characteristics of the particular system. Final output values may then be the result of any standard interpolation of adjacent grid posts, which may be calculated as a weighted average of adjacent samples.

In one particular case, to expedite calculations where memory was readily available, re-sampled input and output values are stored in a fixed 2-dimensional grid, the four samples bounding the input values, specifically the four samples closest and therefore circumscribing the input value on the sample grid, may be combined in an algorithmic way (e.g., a bilinear weighted average) to determine the desired output value. For example, in the case of a fixed grid spanning the entire input domain, input points and their corrected output values are calculated and stored. The stored values may be later used as interpolated lookup values.

The examples described above readily extend to more than the anticipated two dimensions of current touch panels, requiring only that the bounding regions (in 2-dimensions, triangles) be isomorphic between the input domain and the output range and that a parametric representation within each bounded region is possible and somewhat accurate.

Example embodiments of the present invention provide for varying amounts of coupling between axes (x, y) and/or (x, y, z) and compensation by treating the entire 2D surface as a vector field of error measurements. Additionally, arbitrary scalability for input measurements and calibration points may be implemented, which allows for various combinations of input domains, output ranges and variable resolutions of each.

Furthermore, the algorithms described herein may be readily extended to 3D sampling devices and 3D spatial or sensor measurements. The algorithms and related applications may correct non-linearity in the input domain rather than finding an inverse mapping from the target output range values back to the input domain. The resulting set of input and output values may be re-sampled for expedient calculation or optimum data storage.

Figure 5:
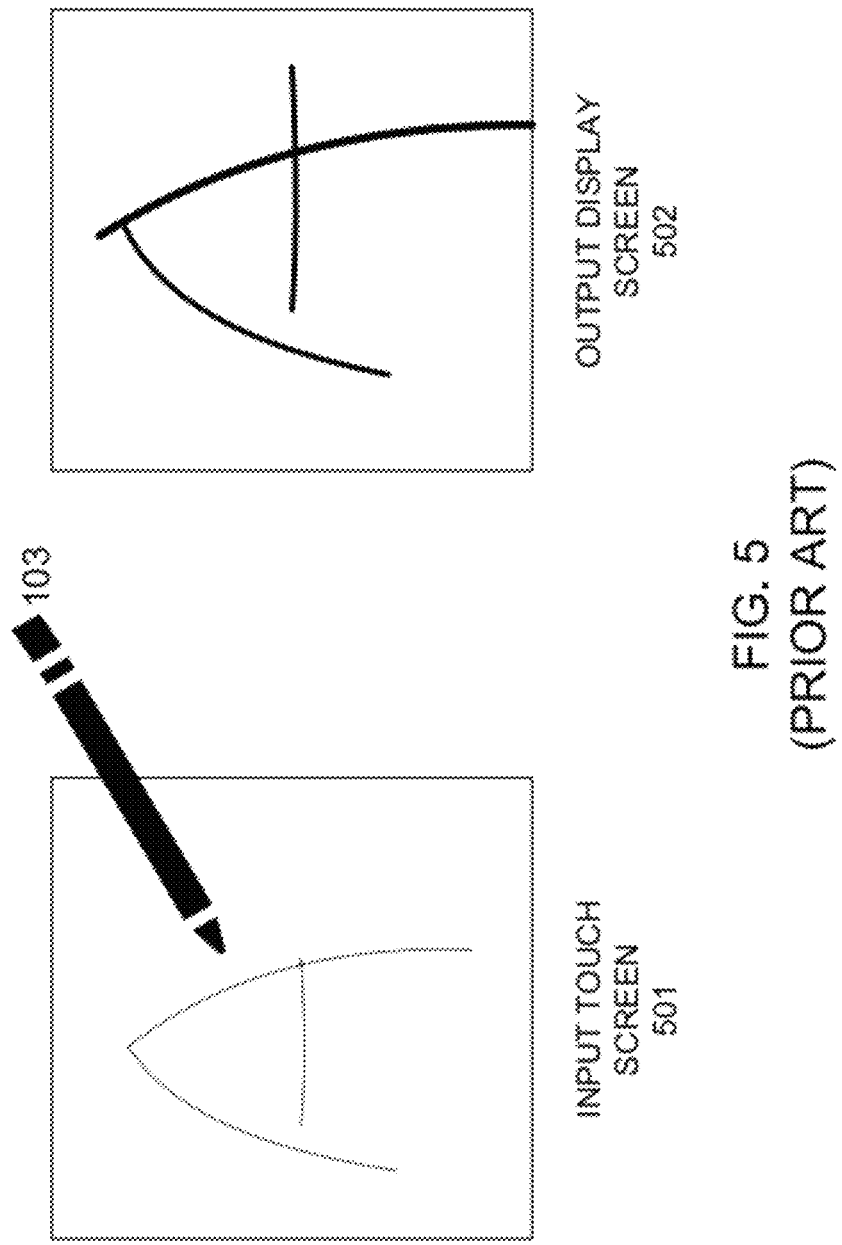
FIG. 5 illustrates an example input and output display of the user input and output, according to example embodiments of the present invention.

FIG. 5 illustrates an example touch screen input according to a conventional configuration. The letter "A" is being drawn on the input touch screen 501 via a stylus pen 103. In this configuration, what is drawn by the user is shown as output on the output display screen 502. As may be observed from the output display screen 502, the lines are thicker, longer and less aligned than the intended input. The output display screen 502 illustrates errors that resulted from the input measurements from the input display screen 501.

Figure 6:
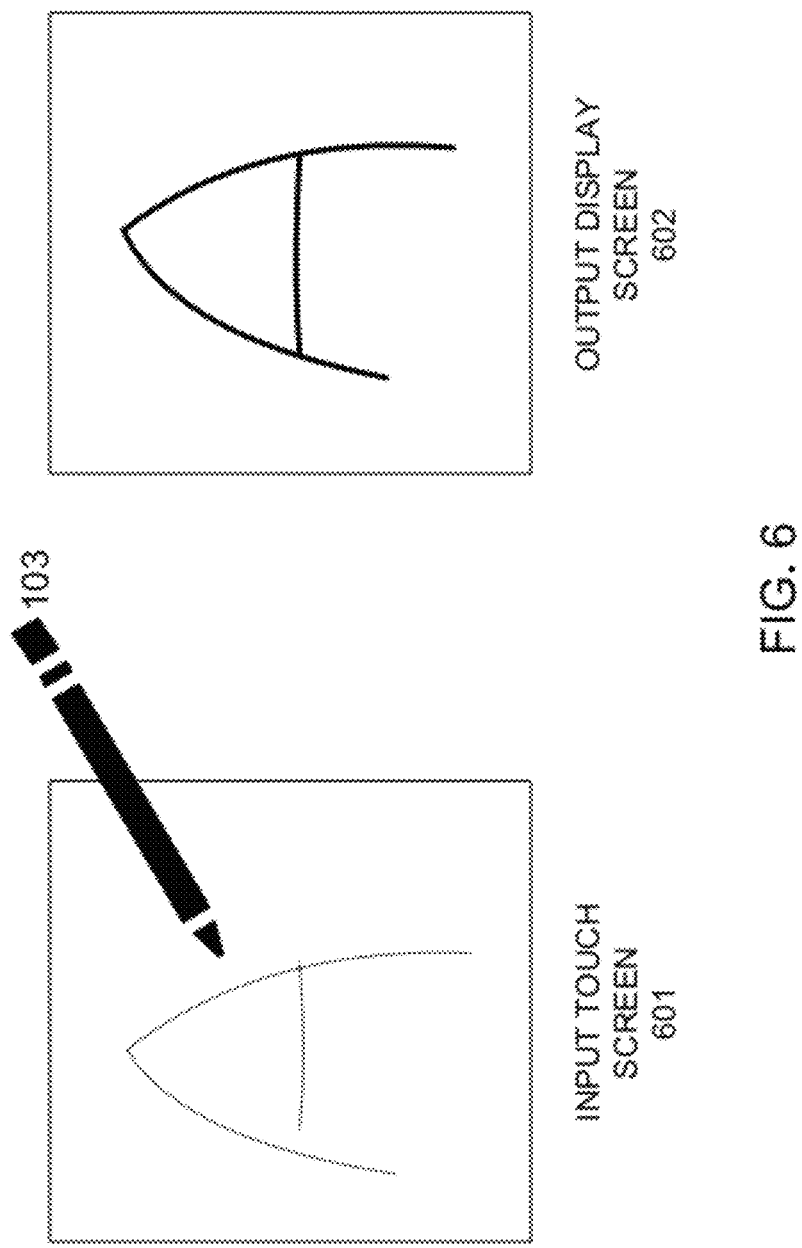
FIG. 6 illustrates an example input and output display of the user input and output, according to example embodiments of the present invention.

FIG. 6 illustrates an example touch screen input according to an example embodiment of the present invention. Referring to FIG. 6, the letter "A" is being drawn on the input touch screen 601 via a stylus pen 103. In this configuration, what is drawn by the user is shown as output on the output display screen 602. As may be observed from the output display screen 602, the lines are substantially similar to the intended input. The output display screen 602 illustrates a significantly similar display to the input measurements from the input display screen 601. Compared to FIG. 5, the result of the output display screen of 602 represents a significant improvement over conventional display errors.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components 101, 102, etc.

Figure 7:
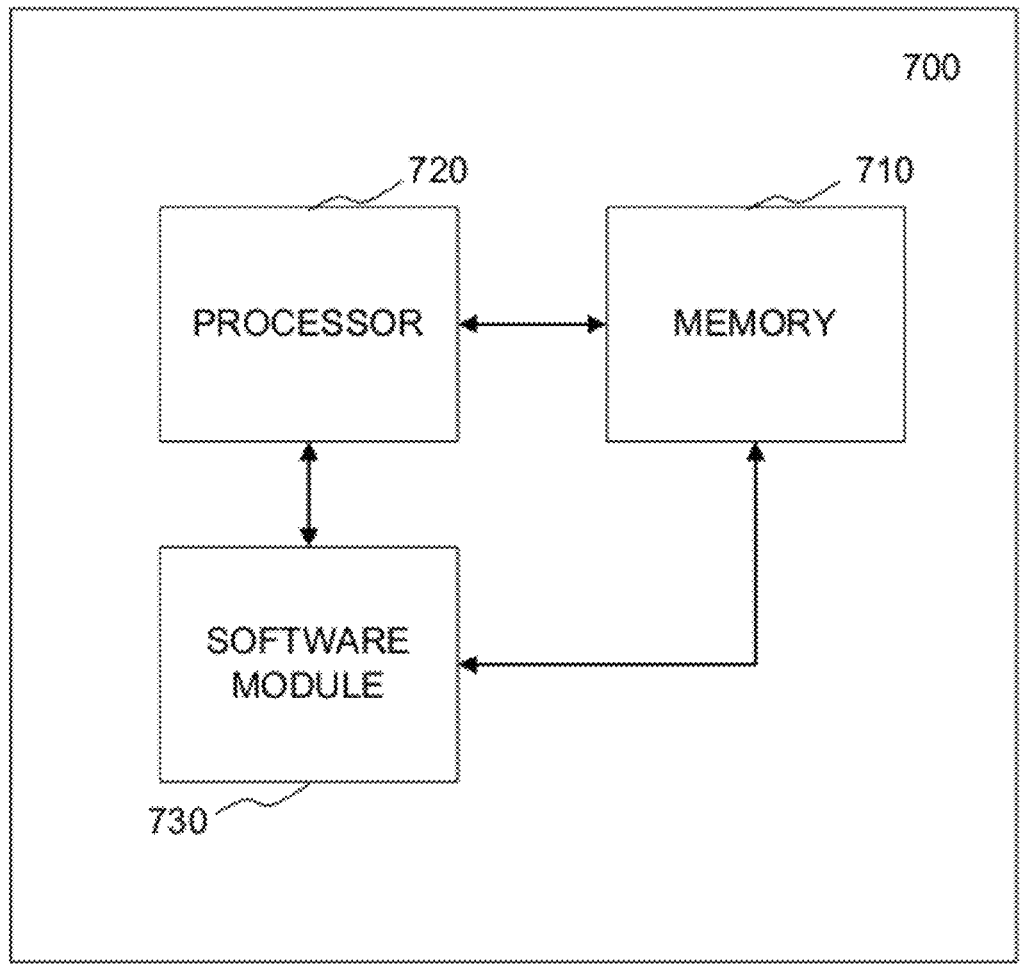
FIG. 7 illustrates an example computer network entity that is configured to store instructions and corresponding hardware to execute those instructions to perform example processing computations, according to example embodiments of the present invention.
Figure 8:
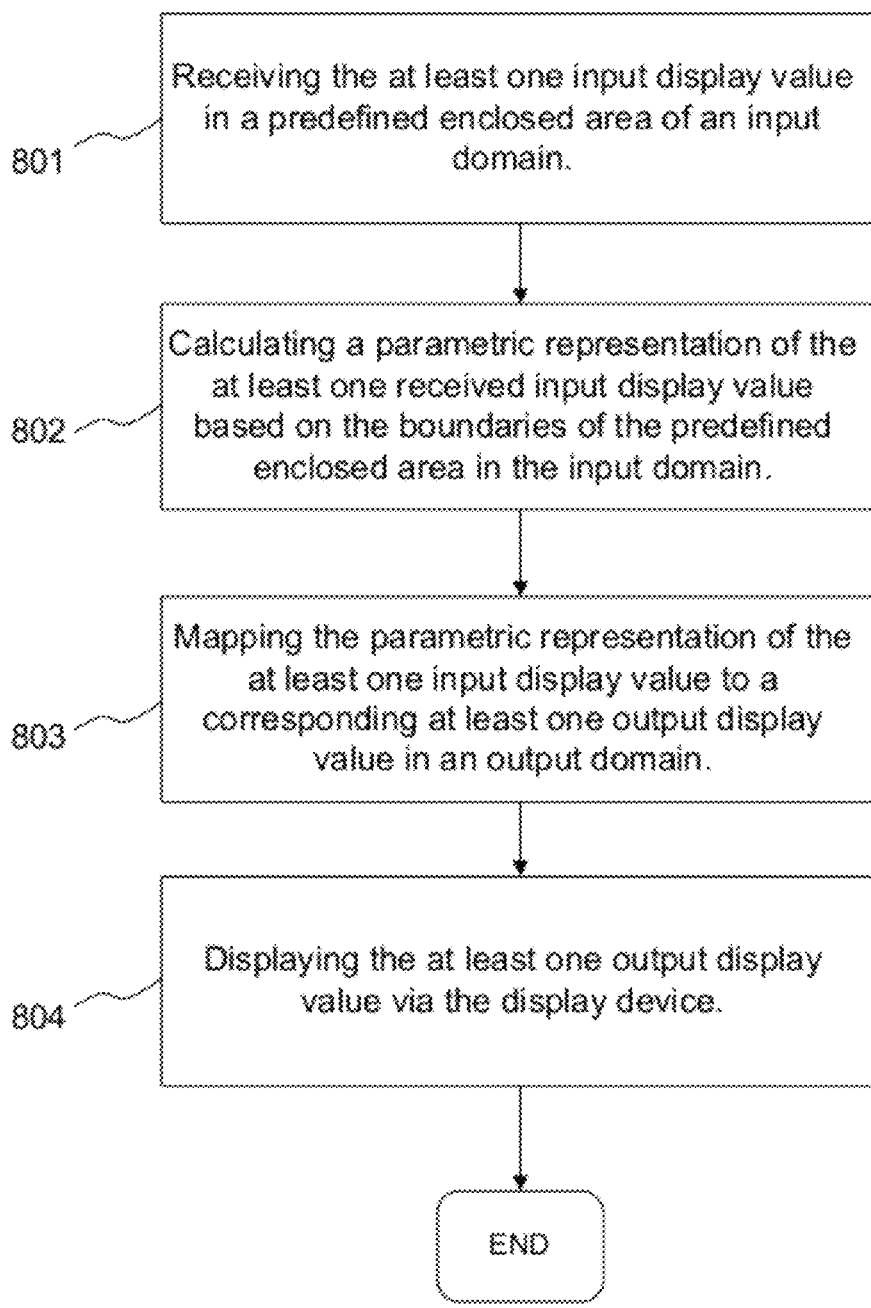
FIG. 8 illustrates an example flow diagram according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

One example method may include a method of generating display data based on at least one input display value received from a touch screen device. The method may include receiving the at least one input display value in a predefined enclosed area of an input domain, at operation 801. The method may also include calculating a parametric representation of the at least one received input display value based on the boundaries of the predefined enclosed area in the input domain, at operation 802. The method may further include mapping the parametric representation of the at least one input display value to a corresponding at least one output display value in an output domain, at operation 803 and displaying the at least one output display value via the display device at operation 804.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of generating display data based on at least one input display value received from a touch screen device, the method comprising:

receiving the at least one input display value in an input mesh of triangles comprising a plurality of predefined enclosed triangles of an input domain defined by corners of the plurality of predefined enclosed triangles in the input domain;

calculating a parametric representation of the at least one received input display value based on the boundaries of the plurality of predefined enclosed triangles in the input domain comprising a linear combination of the corners of the plurality of predefined enclosed triangles in the input domain, wherein the parametric representation is a weighted value of the at least one input display value position with respect to a plurality of bounding point positions defining the boundaries of the plurality of predefined enclosed triangles, and wherein the weighted value includes linear weights corresponding to each of the plurality of bounding point positions which form an expression of distances from the input display value to each of the plurality of bounding point positions of the plurality of predefined enclosed triangles;

applying the linear weights to at least one output display value of bounding point positions of an output display corresponding to the at least one input display value;

mapping the parametric representation of the at least one input display value to a corresponding at least one output display value in an output domain to create the at least one output display value defined by the linear weights with reference to corners of an output mesh of triangles comprising a plurality of predefined enclosed triangles in the output domain, wherein the linear weights comprise at least two weights which are a weighted combination of at least two input vectors, and wherein the at least two weights are used to create at least two output vectors which provide the at least one output display value; and displaying the at least one output display value via the display device.

2. The method of claim 1, wherein the mapping the parametric representation of the at least one input display value to the at least one output display value comprises creating the at least one output display value based on the boundaries of the plurality of predefined enclosed triangles in the output domain.

3. The method of claim 1, wherein the calculating a parametric representation of the received at least one input display value based on the boundaries of the plurality of predefined enclosed triangles in the input domain comprises calculating at least one of a barycentric combination of vertices and a linear combination of vertices of the plurality of predefined enclosed triangles in the input domain.

4. The method of claim 1, wherein the at least one output display value is an error corrected value of the at least one input display value.

5. An apparatus configured to generate display data based on at least one input display value received from a touch screen device, the apparatus comprising:

a receiver configured to receive the at least one input display value in an input mesh of triangles comprising a plurality of predefined enclosed triangles of an input domain defined by corners of the plurality of predefined enclosed triangles in the input domain;

a processor configured to calculate a parametric representation of the at least one received input display value based on the boundaries of the plurality of predefined enclosed triangles in the input domain comprising a linear combination of the corners of the plurality of predefined enclosed triangles in the input domain, wherein the parametric representation is a weighted value of the at least one input display value position with respect to a plurality of bounding point positions defining the boundaries of the plurality of predefined enclosed triangles, and wherein the weighted value includes linear weights corresponding to each of the plurality of bounding point positions which form an expression of distances from the input display value to each of the plurality of bounding point positions of the plurality of predefined enclosed triangles;

apply the linear weights to at least one output display value of bounding point positions of an output display corresponding to the at least one input display value, and map the parametric representation of the at least one input display value to a corresponding at least one output display value in an output domain to create the at least one output display value defined by the linear weights with reference to corners of an output mesh of triangles comprising a plurality of predefined enclosed triangles in the output domain, wherein the linear weights comprise at least two weights which are a weighted combination of at least two input vectors, and wherein the at least two weights are used to create at least two output vectors which provide the at least one output display value; and a display configured to display the at least one output display value.

6. The apparatus of claim 5, wherein the mapping the parametric representation of the at least one input display value to the at least one output display value comprises creating the at least one output display value based on the boundaries of the plurality of predefined enclosed triangles in the output domain.

7. The apparatus of claim 5, wherein the calculating a parametric representation of the received at least one input display value based on the boundaries of the plurality of predefined enclosed triangles in the input domain comprises calculating at least one of a barycentric combination of vertices and a linear combination of vertices of the plurality of predefined enclosed triangles in the input domain.

8. The apparatus of claim 5, wherein the at least one output display value is an error corrected value of the at least one input display value.

9. A non-transitory computer readable storage medium comprising instructions that when executed cause a processor to perform generating display data based on at least one input display value received from a touch screen device, the processor being further configured to perform:

receiving the at least one input display value in an input mesh of triangles comprising a plurality of predefined enclosed triangles of an input domain defined by corners of the plurality of predefined enclosed triangles in the input domain;

calculating a parametric representation of the at least one received input display value based on the boundaries of the plurality of predefined enclosed triangles in the input domain comprising a linear combination of the corners of the plurality of predefined enclosed triangles in the input domain, wherein the parametric representation is a weighted value of the at least one input display value position with respect to a plurality of bounding point positions defining the boundaries of the plurality of predefined enclosed triangles, and wherein the weighted value includes linear weights corresponding to each of the plurality of bounding point positions which form an expression of distances from the input display value to each of the plurality of bounding point positions of the plurality of predefined enclosed triangles;

applying the linear weights to at least one output display value of bounding point positions of an output display corresponding to the at least one input display value;

mapping the parametric representation of the at least one input display value to a corresponding at least one output display value in an output domain to create the at least one output display value defined by the linear weights with reference to corners of an output mesh of triangles comprising a plurality of predefined enclosed triangles in the output domain, wherein the linear weights comprise at least two weights which are a weighted combination of at least two input vectors, and wherein the at least two weights are used to create at least two output vectors which provide the at least one output display value; and displaying the at least one output display value via the display device.

10. The non-transitory computer readable storage medium of claim 9, wherein the mapping the parametric representation of the at least one input display value to the at least one output display value comprises creating the at least one output display value based on the boundaries of the plurality of predefined enclosed triangles in the output domain.

11. The non-transitory computer readable storage medium of claim 9, wherein the calculating a parametric representation of the received at least one input display value based on the boundaries of the plurality of predefined enclosed triangles in the input domain comprises calculating at least one of a barycentric combination of vertices of the plurality of predefined enclosed triangles in the input domain.

* * * * *